US008783974B2

(12) United States Patent
Chen

(10) Patent No.: US 8,783,974 B2
(45) Date of Patent: Jul. 22, 2014

(54) PHOTOGRAPHIC APPARATUS AND CASE STRUCTURE THEREOF

(71) Applicant: Vivotek Inc., New Taipei (TW)

(72) Inventor: Chih-Hao Chen, New Taipei (TW)

(73) Assignee: Vivotek Inc., New Taipei (TW)

( * ) Notice: Subject to any disclaimer, the term of this patent is extended or adjusted under 35 U.S.C. 154(b) by 0 days.

(21) Appl. No.: 13/952,255

(22) Filed: Jul. 26, 2013

(65) Prior Publication Data
US 2014/0037282 A1 Feb. 6, 2014

(30) Foreign Application Priority Data

Aug. 1, 2012 (TW) .............................. 101214895 U

(51) Int. Cl.
G07B 17/00 (2006.01)
G08B 13/196 (2006.01)
(52) U.S. Cl.
CPC .............................. G08B 13/19619 (2013.01)
USPC ....................................................... 396/427
(58) Field of Classification Search
CPC ............................................... G08B 13/19619
USPC ....................................................... 396/427
See application file for complete search history.

(56) References Cited

U.S. PATENT DOCUMENTS

| 6,434,331 | B1* | 8/2002 | Araoka et al. | 396/72 |
| 2011/0304732 | A1* | 12/2011 | Uchida et al. | 348/143 |
| 2012/0002301 | A1* | 1/2012 | Nakajima | 359/700 |

* cited by examiner

Primary Examiner — Clayton E Laballe
Assistant Examiner — Dennis Hancock
(74) Attorney, Agent, or Firm — Morris Manning & Martin LLP; Tim Tingkang Xia, Esq.

(57) ABSTRACT

A case structure includes a main body, a cover and a seal. The main body has an accommodating space and an inner wall surface forming the accommodating space. The accommodating space has an opening. The main body includes at least two first fastening portions. The cover is assembled to the main body in a detachable way. The cover has a connection position and a lock position relative to the main body. The cover has an annular side wall surface and at least two second fastening portions. The seal is disposed around the annular side wall surface of the cover. One of each first fastening portion and each second fastening portion has a release section and a fastening section connected to each other. The other of each first fastening portion and each second fastening portion has a support arm and a block extended from the support arm.

14 Claims, 5 Drawing Sheets

PHOTOGRAPHIC APPARATUS AND CASE STRUCTURE THEREOF

CROSS-REFERENCE TO RELATED APPLICATIONS

This non-provisional application claims priority under 35 U.S.C. §119(a) on Patent Application No(s). 101214895 filed in Taiwan, R.O.C. on Aug. 1, 2012, the entire contents of which are hereby incorporated by reference.

TECHNICAL FIELD

The disclosure relates to a case structure, more particularly to a waterproof case structure.

BACKGROUND

Generally speaking, users may set up surveillance cameras indoors or outdoors for recording a video in a particular place during a period of time. Thereby, users can monitor the situation of the specific place. When a surveillance camera is used outdoors, however, the expected service life thereof may be strongly influenced. For instance, environment factors such as moisture or sunlight reduce the life of the surveillance camera.

As a result, for the service life of the surveillance camera, the waterproof treatment is usually conducted on the surveillance camera and the short circuit caused by moisture in the surveillance camera can be avoided. Specifically, the surveillance camera comprises a case, a cover, a camera lens and an associated electronic circuitry. The camera lens and the associated electronic circuitry are installed inside the case. The case and the cover are connected to each other to accommodate the camera lens and the associated electronic circuitry. A waterproof ring is disposed between the case and the cover, and the cover is tightly locked to the case so that the waterproof ring can fill the gap between the case and the cover. However, the result of the aforementioned waterproof approach depends on the connection strength between the case and the cover. When the connection strength between the case and the cover is stronger, the waterproof effect is better. Nonetheless, the waterproof ring is vulnerable to the powerful external compression which leads to the decrease in the service life thereof.

Moreover, traditionally, to tightly connect the cover and the case, screw threads are disposed on the case and the cover. Then, the cover is tightly fixed to the case by equipments. This approach, however, increases the assembly time. Consequently, how to make a surveillance camera with the satisfactory waterproof effect to extend the service life of the surveillance camera and how to reduce the assembly time of the surveillance camera are the issues need to be addressed by the researchers.

SUMMARY

A case structure comprises a main body, a cover and a seal. The main body has an accommodating space and an inner wall surface forming the accommodating space. The accommodating space has an opening. The main body comprises at least two first fastening portions. The cover is assembled to the main body in a detachable way. The cover has a connection position and a lock position relative to the main body. The cover has an annular side wall surface and at least two second fastening portions. The seal is disposed around the annular side wall surface of the cover. One of each of the first fastening portions and each of the second fastening portions has a release section and a fastening section connected to each other. The other of each of the first fastening portions and each of the second fastening portions has a support arm and a block extended from the support arm. When the cover is at the connection position, the cover covers the opening, the two support arms are located on the two release sections respectively, and the seal is disposed between the inner wall surface and the annular side wall surface to form a waterproof space between the main body and the cover. When the cover rotates an angle relative to the main body to move from the connection position to the lock position, the two support arms move from the two release sections to the two fastening sections respectively, and the two blocks are fastened with the two fastening sections, so as to make the cover be fixed to the main body.

Moreover, a photographic apparatus comprises a main body, a cover and a camera lens module. The main body has an accommodating space and an inner wall surface forming the accommodating space. The accommodating space has an opening. The main body comprises at least two first fastening portions. The cover is assembled to the main body in a detachable way. The cover has a connection position and a lock position relative to the main body. The cover has an annular side wall surface and at least two second fastening portions. The camera lens module is assembled to the main body and is located inside the accommodating space. One of each of the first fastening portions and each of the second fastening portions has a release section and a fastening section connected to each other. The other of each of the first fastening portions and each of the second fastening portions has a support arm and a block extended from the support arm. When the cover is at the connection position, the cover covers the opening, the two support arms are located on the two release sections respectively. When the cover rotates an angle relative to the main body to move from the connection position to the lock position, the two support arms move from the two release sections to the two fastening sections respectively, and the two blocks are fastened with the two fastening sections, so as to make the cover be fixed to the main body.

BRIEF DESCRIPTION OF THE DRAWINGS

The disclosure will become more fully understood from the detailed description given herein below for illustration only and thus does not limit of the disclosure, wherein.

DETAILED DESCRIPTION

Figure 1:
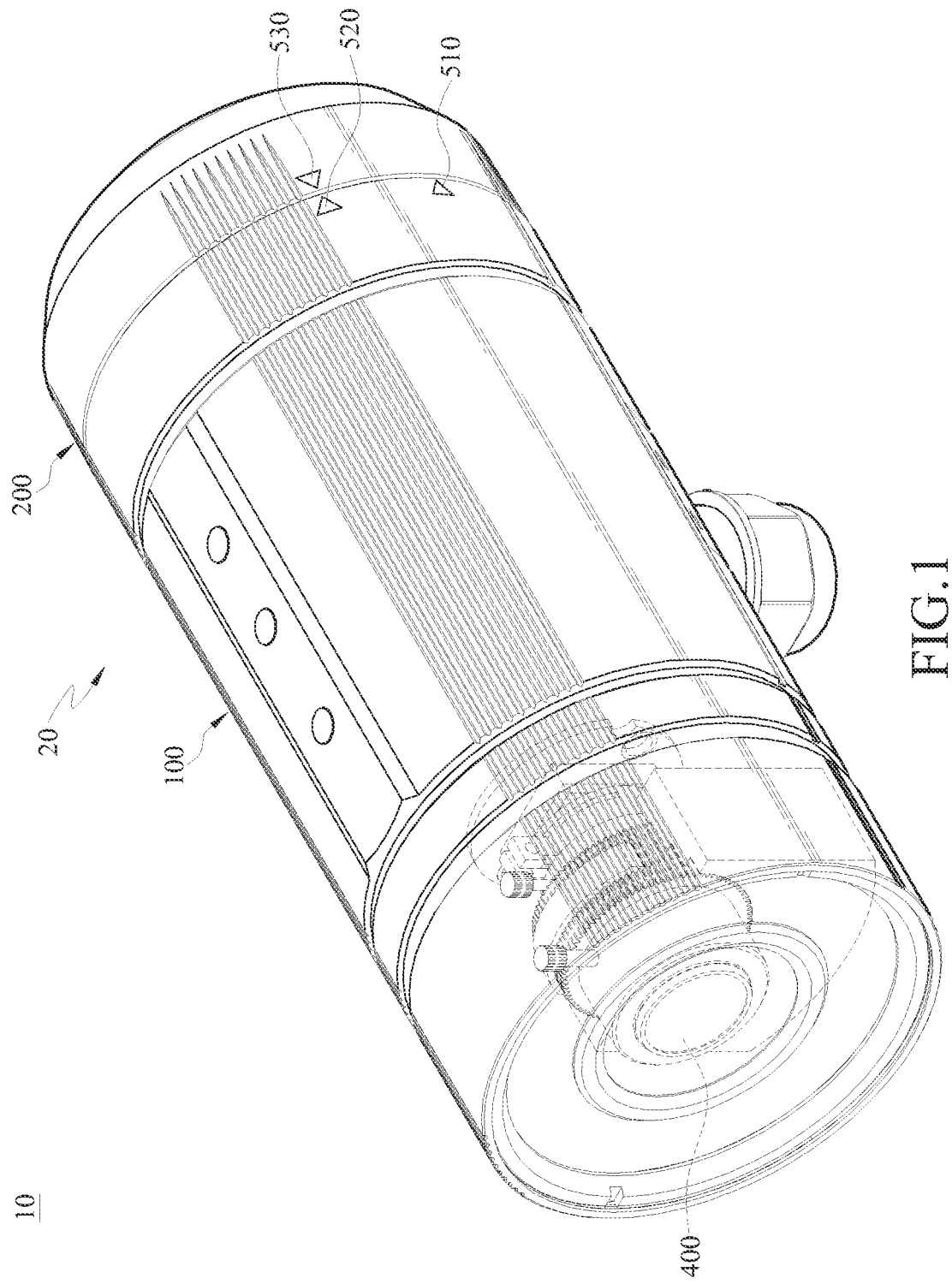
FIG. 1 is a perspective view of a photographic apparatus according to an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known components and devices are schematically shown in order to simplify the drawing.

Figure 2:
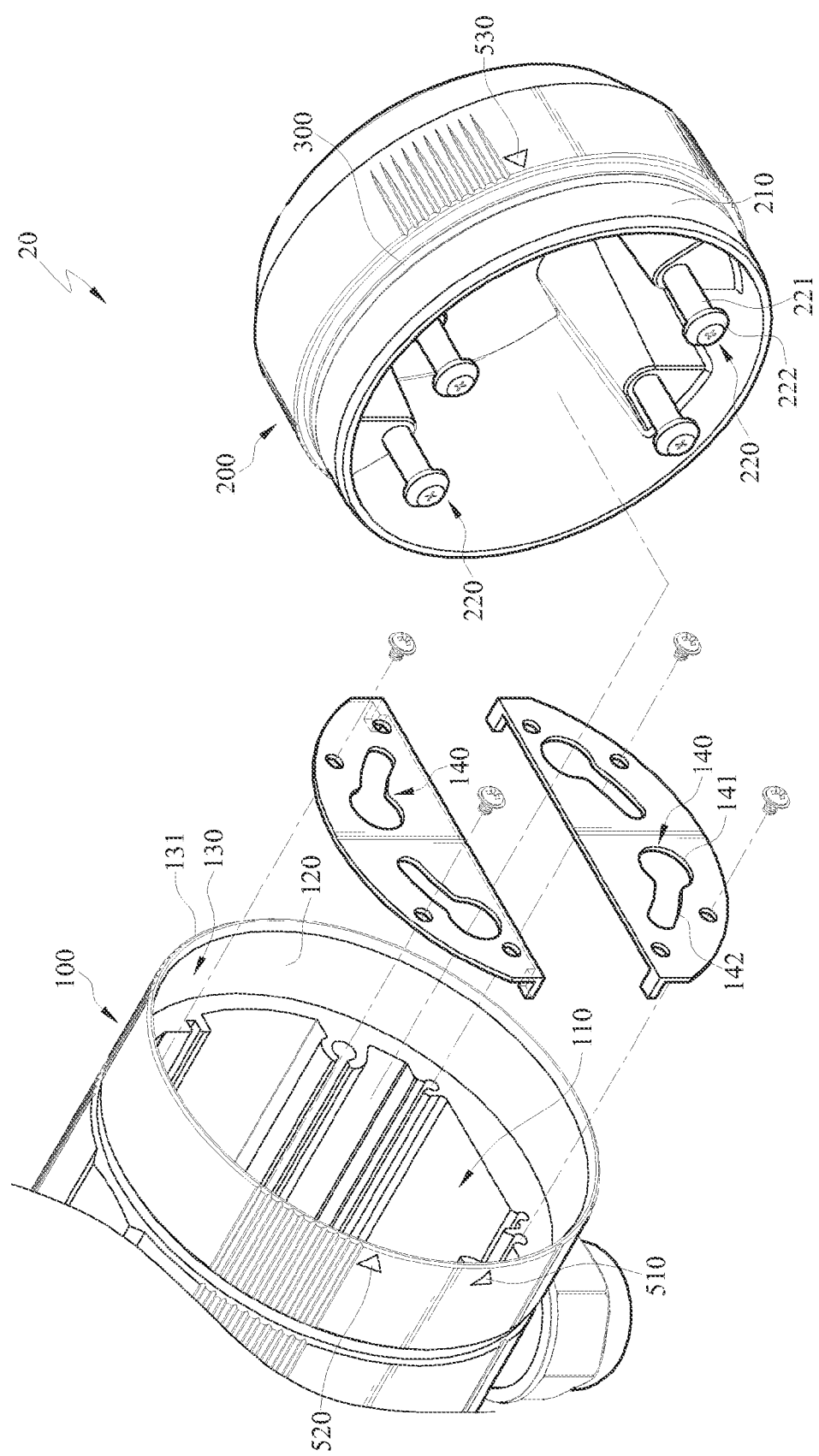
FIG. 2 is an exploded view of FIG. 1.
Figure 3:
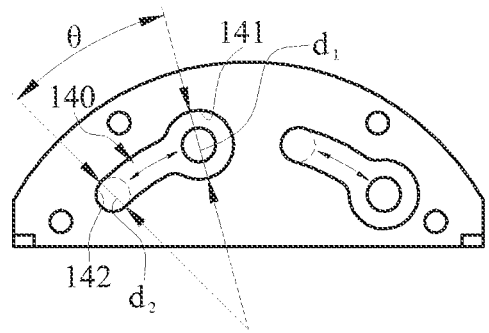
FIG. 3 is a plan view of the first fastening portion in FIG. 1.
Figure 4:
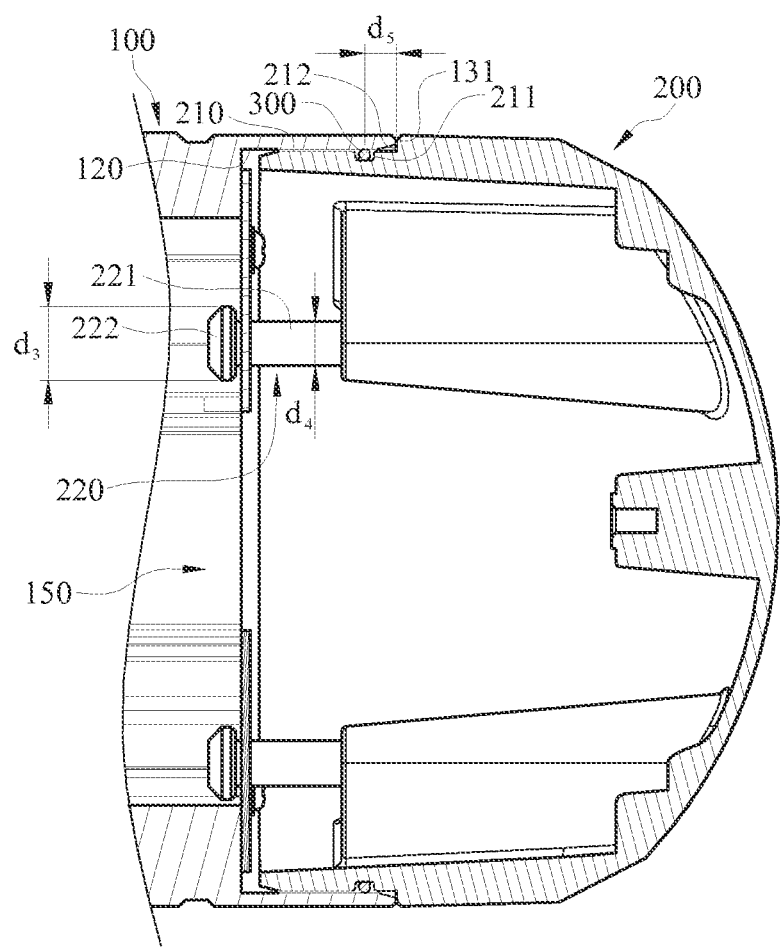
FIG. 4 is a sectional view of FIG. 1.

Referring to FIG. 1 to FIG. 4, FIG. 1 is a perspective view of a photographic apparatus according to an embodiment of the disclosure; FIG. 2 is an exploded view of FIG. 1; FIG. 3 is a plan view of the first fastening portion in FIG. 1; FIG. 4 is a sectional view of FIG. 1.

The photographic apparatus 10 of this embodiment comprises a case structure 20 and a camera lens module 400. The camera lens module 400 is assembled in the case structure 20. The camera lens module 400 comprises a lens and an associated electronic circuitry. Specifically, the case structure 20 comprises a main body 100, a cover 200 and a seal 300. The main body 100 has an accommodating space 110 and an inner wall surface 120 which forms the accommodating space 110. The accommodating space 110 has an opening 130. The main body 100 comprises at least two first fastening portions 140. In this embodiment, each of the first fastening portions 140 has a release section 141 and a fastening section 142 connected to each other, and the release section 141 and the fastening section 142 form a fastening sliding groove. Furthermore, the maximum spacing d1 of the release section 141 is greater than the maximum spacing d2 of the fastening section 142. In this embodiment, the number of the first fastening portion 140 is four, but the disclosure is not limited thereto.

The cover 200 is assembled to the main body 100 in a detachable way. The cover 200 is configured for rotating an angle θ relative to the main body 100 and therefore has a connection position and a lock position. The cover 200 has an annular side wall surface 210 and at least two second fastening portions 220. The second fastening portion 220 is fastened with the first fastening portion 140, so as to make the cover 200 be fixed to the main body 100. Specifically, the second fastening portion 220 has a support arm 221 and a block 222 extending from the support arm 221. Furthermore, the maximum spacing d3 of the lateral side of the block 222 is greater than the maximum spacing d4 of the lateral side of the support arm 221. That is, the width of the block 222 is greater than that of the support arm 221. When the cover 200 rotates an angle θ relative to the main body 100, the support arm 221 and the block 222 move between the release section 141 and the fastening section 142. The detailed movement between the main body 100 and the cover 200 will be illustrated at later stages. Moreover, in this embodiment, the number of the second fastening portions 220 is four, but the disclosure is not limited thereto.

The range of the aforementioned angle θ created by the cover 200 rotating relative to the main body 100 depends on the length of the movement of the support arm 221 from the release section 141 to the fastening section 142 (as shown in FIG. 3). In this embodiment, the angle θ is 30 degrees. In other embodiments, however, the angle θ may be any angle less than 180 degrees.

Additionally, in other embodiments, the structure of the first fastening portion 140 of the main body 100 and the structure of the second fastening portion 220 of the cover 200 are interchangeable. In other words, the first fastening portion 140 has a support arm 221 as mentioned above and a block 222 extending from the support arm 221. By comparison, the second fastening portion 220 has a release section 141 and a fastening section 142 connected to each other as mentioned before.

The seal 300 is disposed around the annular side wall surface 210 of the cover 200. When the cover 200 covers the opening 130, the seal 300 is sandwiched between the inner wall surface 120 and the annular side wall surface 210, so as to form a waterproof space 150 between the main body 100 and the cover 200. Specifically, the water proof space 150 is a space formed by the cover 200 covering the opening 130 of the main body 100. Additionally, since the seal 300 is sandwiched between the inner wall surface 120 and the annular side wall surface 210 and is against the inner wall surface 120 and the annular side wall surface 210, the seal 300 fill the gap between the main body 100 and the cover 200 to prevent liquid from flowing into the waterproof space 150. Thereby, the case structure is configured for waterproofing. Furthermore, since the seal 300 of this embodiment is dispose around the annular side wall surface 210 of the cover 200, the waterproof effect of the case structure 20 depends on the gap between the inner wall surface 120 and the annular side wall surface 210 and the dimensional relationship between the very same gap and the seal 300. When the size of the seal 300 is greater than the gap between the inner wall surface 120 and the annular side wall surface 210, the case structure 20 is configured for waterproofing. Thus, the case structure 20 of this embodiment does not require that the cover and the case are connected tightly as mentioned in the related art. As a result, it can avoid the situation that the powerful external force squeezes the seal 300, which leads to the failure of the waterproof function.

Nevertheless, in other embodiments, when the waterproof function is not required, it is possible not to equip the seal 300 in the case structure 20.

In other embodiments, the annular side wall surface 210 of the cover 200 has a groove 211 (as shown in FIG. 4). The seal 300 is mounted in the groove 211 to fix the relative position of the seal 300 and the cover 200.

In this and other embodiments, the cover 200 has a stop surface 212. The stop surface 212 faces the main body 100 and is connected with the annular side wall surface 210. When the cover 200 is at the connection position, the stop surface 212 is against the edge 131, which forms the opening 130, of the main body 100. The seal 300 and the stop surface 212 are separated by a distance d5. The distance d5 can be any distance greater than zero, so as to prevent the seal 300 from being sandwiched between the stop surface 212 and the edge 131, which forms the opening 130, of the main body 100. Thereby, it is ensured that the satisfactory waterproof effect is achieved because the seal 300 is located between the inner wall surface 120 and the annular side wall surface 210.

In this and other embodiments, the main body 100 has a connection position indicating portion 510 and a lock position indicating portion 520. The connection position indicating portion 510 and the lock position indicating portion 520 are separated by a distance. The cover 200 has a target indicating portion 530. In other embodiments, however, the connection position indicating portion 510 and the lock position indicating portion 520 can be disposed on the cover 200, while the target indicating portion 530 is disposed on the main body 100.

Figure 5:
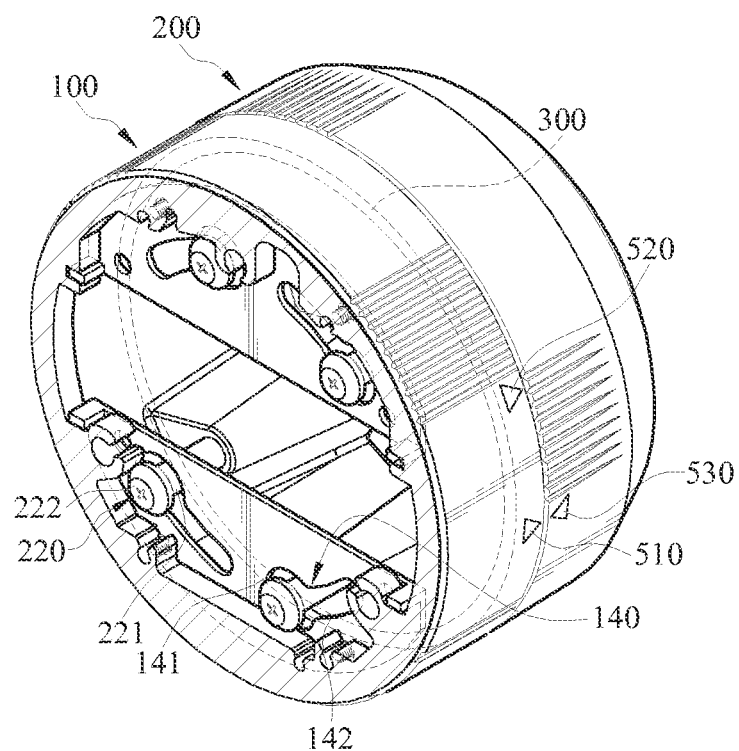
FIG. 5 and FIG. 6 are assembly views of the case structure in FIG. 1.
Figure 6:
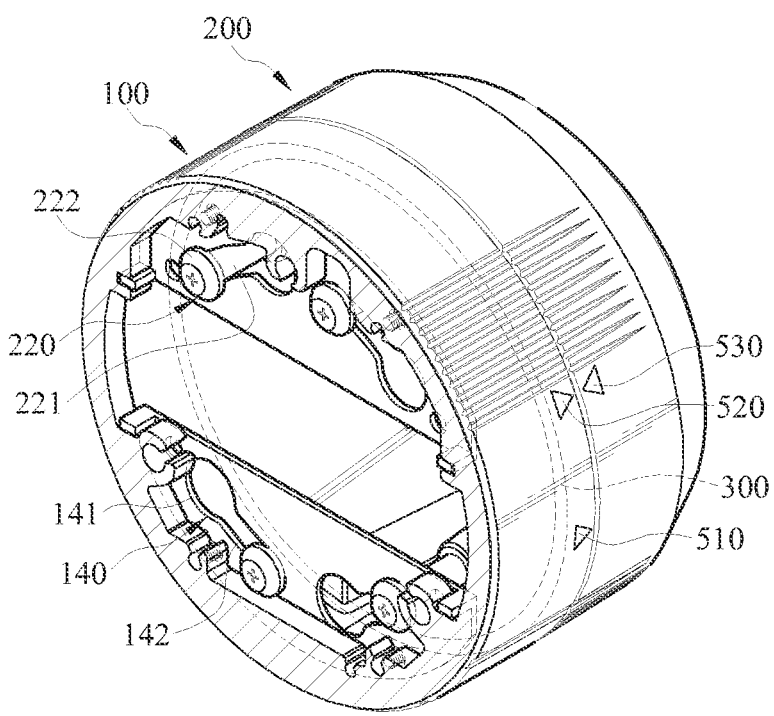

Referring to FIG. 5 and FIG. 6, FIG. 5 and FIG. 6 are assembly views of the case structure in FIG. 1. When the cover 200 is at the connection position, the cover 200 covers the opening 130 and the target indicating portion 530 of the cover 200 aims at the connection position indicating portion 510. The four support arms 221 are located at the four release sections 141 respectively, and the seal 300 is sandwiched between the inner wall surface 120 and the annular side wall surface 210, so as to form a waterproof space between the main body 100 and the cover 200.

When the cover 200 rotates an angle θ relative to the main body 100 and therefore moves from the connection position to the lock position, the target indicating portion 530 of the cover 200 aims at the lock position indicating portion 520. In this period, the four support arms 221 move form the four release sections 141 to the four fastening sections 142 respectively, and the four blocks 222 are fastened with the four fastening sections 142 respectively, so as to make the cover 200 be fixed to the main body 100. Since the cover 200 of this embodiment only requires rotating 30 degrees relative to the main body 100 to make the cover be fixed to the main body 100 or be disassembled from the main body 100. Thereby, the case structure 20 is configured for rapid assembly and disassembly.

Figure 7:
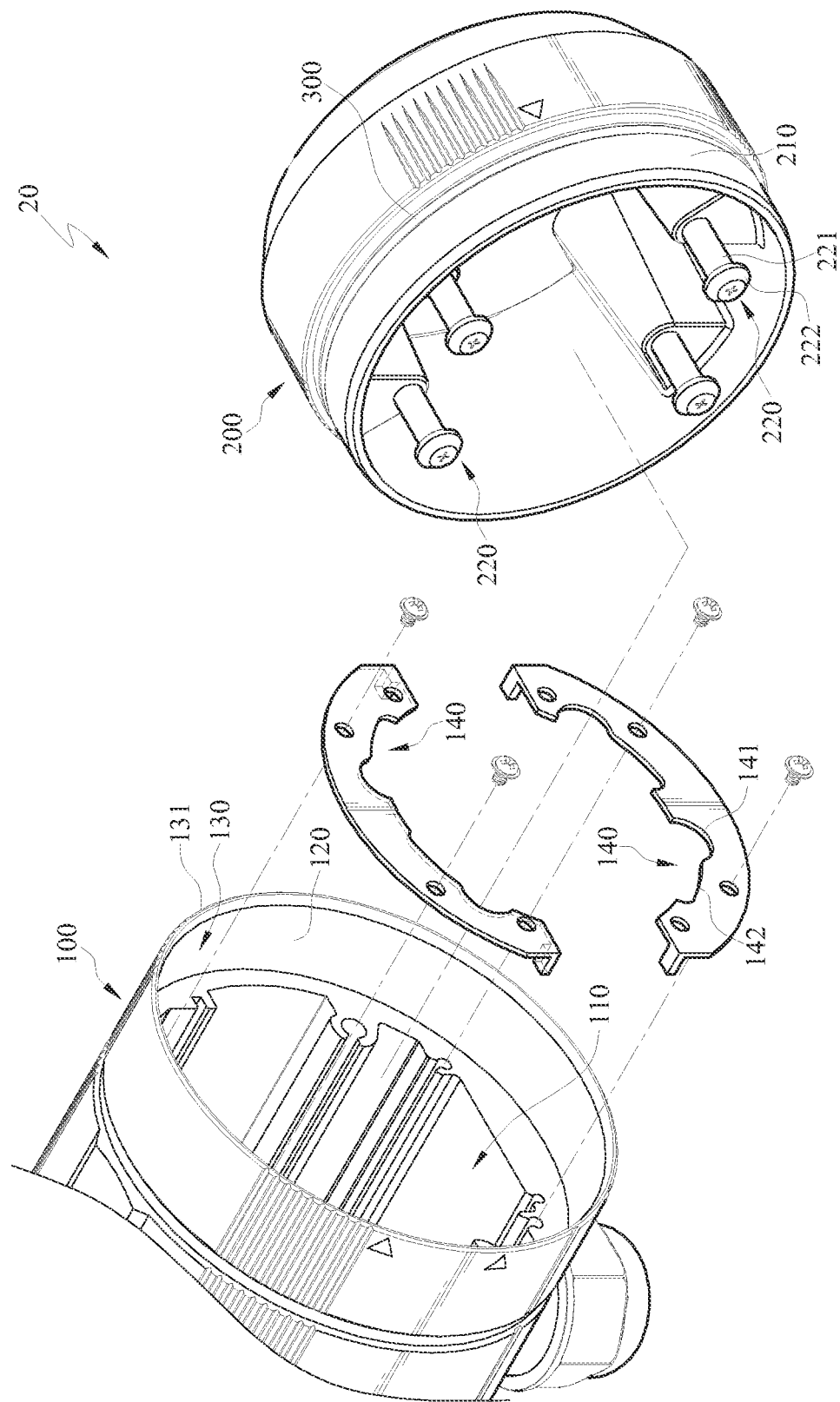
FIG. 7 is an exploded view of a case structure according to another embodiment of the disclosure.

Referring to FIG. 7, FIG. 7 is an exploded view of a case structure according to another embodiment of the disclosure. The case structure 20 of this embodiment comprises a main body 100, a cover 200 and a seal 300. The main body 100 has an accommodating space 110 and an inner wall surface 120 which forms the accommodating space 110. The accommodating space 110 has an opening 130. The main body 100 comprises at least two first fastening portions 140. In this embodiment, each of the first fastening portions 140 has a release section 141 and a fastening section 142 connected to each other, and the release section 141 and the fastening section 142 form a lateral side of a fastening piece. In this embodiment, the number of the first fastening portion 140 is four, but it is not intended to limit the disclosure.

The cover 200 is assembled to the main body 100 in a detachable way. The cover 200 has a connection position and a lock position relative to main body 100. The cover 200 has an annular side wall surface 210 and at least two second fastening portions 220. In this embodiment, the second fastening portion 220 has a support arm 221 and a block 222 radially extending from the support arm 221. In this embodiment, the number of the second fastening portion 220 is four, but the disclosure is not limited thereto.

In the photographic apparatus and the case structure according to abovementioned embodiments, the cover only needs to be rotated an angle relative to the main body to make the block and the fastening section be fastened with each other or make them be separated from each other. Thereby, the cover can be assembled to the main body or disassembled from the main body quickly, and therefore improve the efficiency in terms of assembly.

Moreover, the seal is disposed around the annular side wall surface of the cover. Consequently, when the cover is at the connection position, the cover covers the opening of the main body. Additionally, since the seal is sandwiched between the inner wall surface of the main body and the annular side wall surface of the cover, liquid is prevented from flowing into the case structure and therefore reach the goal of waterproofing.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A case structure comprising:
   a main body having an accommodating space and an inner wall surface forming the accommodating space, the accommodating space having an opening, the main body comprising at least two first fastening portions;
   a cover assembled to the main body in a detachable way, the cover having a connection position and a lock position relative to the main body, the cover having an annular side wall surface and at least two second fastening portions; and
   a seal disposed around the annular side wall surface of the cover;
   wherein one of each of the first fastening portions and each of the second fastening portions has a release section and a fastening section connected to each other, the other of each of the first fastening portions and each of the second fastening portions has a support arm and a block extended from the support arm, when the cover is at the connection position, the cover covers the opening, the two support arms are located on the two release sections respectively, and the seal is disposed between the inner wall surface and the annular side wall surface to form a waterproof space between the main body and the cover, and when the cover rotates an angle relative to the main body to move from the connection position to the lock position, the two support arms move from the two release sections to the two fastening sections respectively, and the two blocks are fastened with the two fastening sections, so as to make the cover be fixed to the main body.

2. The case structure according to claim 1, wherein the release section and the fastening section connected to each other are a fastening sliding groove.

3. The case structure according to claim 1, wherein the release section and the fastening section connected to each other are a lateral side of a fastening piece.

4. The case structure according to claim 1, wherein the annular side wall surface has a groove, and the seal is mounted in the groove.

5. The case structure according to claim 4, wherein the cover has a stop surface, the stop surface faces the main body and is connected to the annular side wall surface, the seal and the stop surface are separated by a distance, and when the cover is at the connection position, the stop surface is against an edge, which forms the opening, of the main body.

6. The case structure according to claim 1, wherein the angle is less than 180 degrees.

7. The case structure according to claim 1, wherein one of the main body and the cover has a connection position indicating portion and a lock position indicating portion, the other of the main body and the cover has a target indicating portion, wherein when the cover is at the connection position, the target indicating portion aims at the connection indicating portion, and when the cover rotates the angle relative to the main body and moves from the connection position to the lock position, the target indicating portion aims at the lock position indicating portion.

8. A photographic apparatus comprising
   a main body having an accommodating space and an inner wall surface forming the accommodating space, the accommodating space having an opening, the main body comprising at least two first fastening portions;
   a cover assembled to the main body in a detachable way, the cover having a connection position and a lock position relative to the main body, the cover having an annular side wall surface and at least two second fastening portions; and
   a camera lens module assembled to the main body and located inside the accommodating space;
   wherein one of each of the first fastening portions and each of the second fastening portions has a release section and a fastening section connected to each other, the other of each of the first fastening portions and each of the second fastening portions has a support arm and a block extended from the support arm, when the cover is at the connection position, the cover covers the opening, the two support arms are located on the two release sections respectively, when the cover rotates an angle relative to the main body to move from the connection position to the lock position, the two support arms move from the two release sections to the two fastening sections respectively, and the two blocks are fastened with the two fastening sections, so as to make the cover be fixed to the main body.

9. The photographic apparatus according to claim 8, wherein the release section and the fastening section connected to each other are a fastening sliding groove.

10. The photographic apparatus according to claim 8, wherein the release section and the fastening section connected to each other are a lateral side of a fastening piece.

11. The photographic apparatus according to claim 8, further comprising a seal, wherein the annular side wall surface has a groove, and the seal is mounted in the groove.

12. The photographic apparatus according to claim 11, wherein the cover has a stop surface, the stop surface faces the main body and is connected to the annular side wall surface, the seal and the stop surface are separated by a distance, and when the cover is at the connection position, the stop surface is against an edge, which forms the opening, of the main body.

13. The photographic apparatus according to claim 8, wherein the angle is less than 180 degrees.

14. The photographic apparatus according to claim 8, wherein one of the main body and the cover has a connection position indicating portion and a lock position indicating portion, the other of the main body and the cover has a target indicating portion, wherein when the cover is at the connection position, the target indicating portion aims at the connection indicating portion, and when the cover rotates the angle relative to the main body and moves from the connection position to the lock position, the target indicating portion aims at the lock position indicating portion.

* * * * *